United States Patent
Kalman et al.

(10) Patent No.: US 6,424,756 B1
(45) Date of Patent: Jul. 23, 2002

(54) FOURIER OPTICAL SWITCH

(75) Inventors: Robert F. Kalman, Cupertino; Robert T. Weverka, San Mateo, both of CA (US)

(73) Assignee: ONI Systems Corp., San Jose, CA (US)

( * ) Notice: Subject to any disclaimer, the term of this patent is extended or adjusted under 35 U.S.C. 154(b) by 0 days.

(21) Appl. No.: 09/397,157

(22) Filed: Sep. 15, 1999

(51) Int. Cl.[7] ................................................ G02B 6/42
(52) U.S. Cl. .............................. 385/16; 385/18; 385/20
(58) Field of Search ............................ 385/16, 17, 18, 385/20

(56) References Cited

U.S. PATENT DOCUMENTS

| | | | |
|---|---|---|---|
| 4,365,863 A | * 12/1982 | Broussaud | 385/17 |
| 4,512,036 A | 4/1985 | Laor | 455/615 |
| 4,580,873 A | 4/1986 | Levinson | 350/96.2 |
| 4,859,012 A | * 8/1989 | Cohn | 385/17 |
| 5,165,104 A | 11/1992 | Weverka | 385/7 |
| 5,291,324 A | * 3/1994 | Hinterlong | 359/135 |
| 5,440,654 A | 8/1995 | Lambert, Jr. | 385/17 |
| 6,097,859 A | * 8/2000 | Solgaard | 385/17 |

* cited by examiner

Primary Examiner—Huy Mai
(74) Attorney, Agent, or Firm—Lumen Intellectual Property Services, Inc.

(57) ABSTRACT

An optical switch comprises a two-dimensional array of optical inputs, a Fourier transform lens, and a two-dimensional array of optical outputs. Each of the optical inputs emits an optical beam that is transmitted through the Fourier transform lens to one of the optical outputs. A first deflection means gives each of the optical beams a respective direction of incidence upon the Fourier transform lens. The optical output to which a given beam travels depends on the beam's respective direction of incidence. A second deflection means deflects the optical beams after they have been transmitted through the Fourier transform lens and renders the beams parallel, thereby enabling the beams to couple efficiently to the optical outputs. Each of the deflection means preferably comprises at least one Micro-Electro-Mechanical Systems, or MEMS, deflector array. The optical inputs and outputs preferably comprise optical fibers. The Fourier transform lens overcomes diffraction limitations, since the lens causes the spreading optical beams to reconverge.

19 Claims, 6 Drawing Sheets

FOURIER OPTICAL SWITCH

FIELD OF THE INVENTION

This invention pertains generally to optical switches, and in particular to an optical switch that uses a Fourier transform lens to direct light from an array of optical inputs to an array of optical outputs.

BACKGROUND

Optical fibers are used in a variety of systems, including telecommunication networks and phased array antennas. For such applications, large optical interconnect switches having one thousand or more optical inputs and outputs are needed. In these switches, each one of the inputs should be capable of being connected to any one of the outputs, so that the outputs represent a desired permutation of the inputs.

A number of optical switches have been proposed. In U.S. Pat. No. 4,512,036, Laor describes an optical switch whose fiber optic inputs are attached to piezo-electric benders that can aim the input fibers at different outputs. However, the response time for this switch can be slow, and it can be difficult to reproducibly move the fibers to the desired positions.

In U.S. Pat. No. 5,440,654, Lambert describes a fiber optic switching system having transparent beam deflectors for directing each input beam to the desired output. The beam deflectors are made from an electro-optical phase shifting medium, such as a liquid crystal. To deflect a beam, a diffraction grating is created in the electro-optical material that redirects the beam. This switch is inconvenient because the input beams must be monochromatic, and the color of light being switched must be known in advance.

Levinson, in U.S. Pat. No. 4,580,973, describes an optical matrix switch having m optical to inputs arranged in a one-dimensional array, and a one-dimensional array of n optical outputs placed orthogonal to the light paths of the inputs. An m×n matrix of electromechanically actuated mirrors is positioned so that each input beam can be controllably deflected to any of the outputs. This switch grows prohibitively complex as the number of inputs and outputs is increased, since the number of mirrors needed is equal to the product nm.

In U.S. Pat. No. 4,365,863, Broussaud discloses a switch having a two-dimensional array of inputs facing a two-dimensional array of outputs. Each input beam is controllably deflected toward one of the outputs.

All of the above switches suffer from the limitation that they cannot be reduced in size because of diffraction limits. To miniaturize one of these switches, the radius of the light beams transmitted through the switch must be reduced. However, a beam of width w and wavelength $\lambda$ will inevitably spread with a diffraction angle $\theta$ given approximately by: $\sin \theta = \lambda/w$. Therefore, as one attempts to make the switch smaller, the optical beams diverge, causing much of the light to be lost rather than transmitted to the outputs as required.

Another class of switches uses an acousto-optic medium to direct light beams from the optical inputs to the outputs. Such switches are disclosed in Weverka, U.S. Pat. No. 5,165,104, and in Harris, "Multichannel Acousto-Optic Crossbar Switch," Applied Optics 30 (1991) 4245–4256. The acousto-optic effect used in these switches, however, requires that the optical inputs form a linear array, and that the outputs form another linear array perpendicular to the array of inputs. Therefore the acousto-optic switches are large and cumbersome when many inputs and outputs are used.

SUMMARY OF THE INVENTION

It is therefore a primary object of the present invention to provide a compact switch that overcomes the diffraction limitations of the prior art. An optical switch comprises a two-dimensional array of optical inputs, a Fourier transform lens, and a two-dimensional array of optical outputs. Each of the optical inputs emits an optical beam that is transmitted through the Fourier transform lens to one of the optical outputs. A first deflection means gives each of the optical beams a respective direction of incidence upon the Fourier transform lens. The optical output to which a given beam travels depends on the beam's respective direction of incidence. A second deflection means deflects the optical beams after they have been transmitted through the Fourier transform lens and renders the beams parallel, thereby enabling the beams to couple efficiently to the optical outputs.

In the present switch, the optical inputs are coupled one-to-one with the optical outputs. By controlling the first deflection means, any directions of incidence may be given to the optical beams; therefore, the optical outputs correspond to any desired permutation of the optical inputs.

In the preferred embodiment, the switch further comprises a first polarizing beam splitter for splitting each of the optical beams into two beam components. In this embodiment, the first deflection means comprises two deflector arrays, one for each of the two beam components. After striking the deflector arrays, the two beam components are recombined by the first polarizing beam splitter, and are subsequently transmitted through the Fourier transform lens. The preferred embodiment also comprises a second polarizing beam splitter located on the transmission side of the Fourier transform lens.

The second polarizing beam splitter splits and recombines the beams, and the second deflection means comprises two more deflector arrays.

Each of the deflection means preferably comprises at least one Micro-Electro-Mechanical Systems, or MEMS, deflector array. The optical inputs and outputs preferably comprise optical fibers. The MEMS arrays and optical fibers allow the switch to be made extremely compact. The Fourier transform lens overcomes diffraction limitations, since the lens causes the spreading optical beams to reconverge.

DETAILED DESCRIPTION

Figure 1:
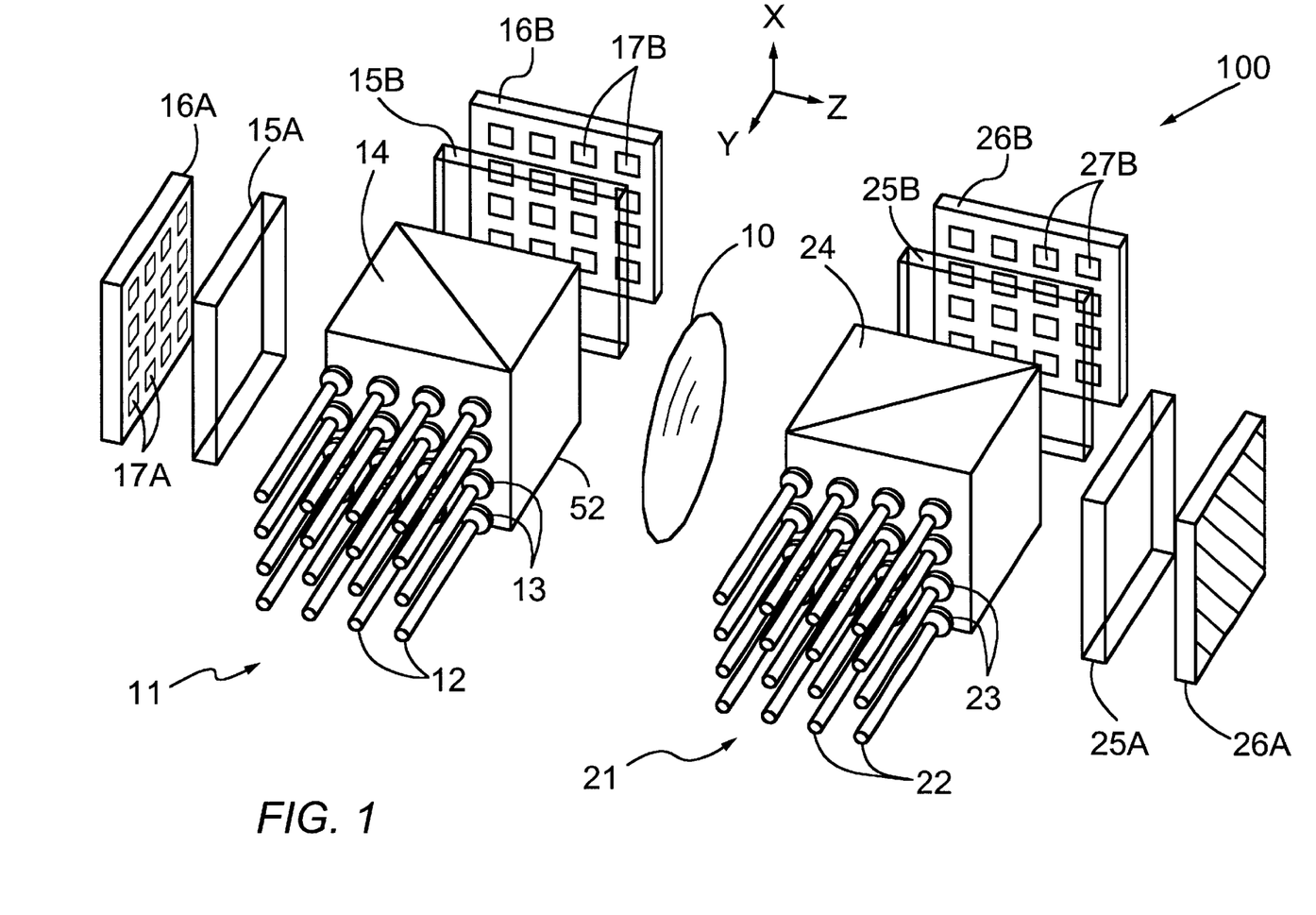
FIG. 1 is a perspective view of an optical switch according to the preferred embodiment of the invention.

FIG. 1 shows an optical switch 100 according to the preferred embodiment of the invention. Cartesian x, y, and z axes are defined as shown in FIG. 1. The switch comprises a plurality of optical inputs 12; each of the optical inputs delivers an optical beam. The optical inputs are arranged in a two-dimensional input array 11. Preferably, each of the optical inputs 12 comprises an optical fiber. Light is coupled out of each fiber using a microlens 13. Other standard optics may be used in place of each microlens 13.

In FIG. 1, input array 11 is illustrated as a 4×4 array of optical inputs 12. However, input array 11 may in general have an) size. For example, input array 11 may be a 32×32 array, or even larger. Input array 11 is preferably a square array, but may be rectangular.

The optical beams emitted by input array 11 are incident upon a first polarizing beam splitter 14. Polarizing beam splitters have the well known ability to split an optical beam into two components having orthogonal polarizations. For the sake of illustration, first polarizing beam splitter 14 is depicted as transmitting light polarized in the yz-plane, and reflecting x-polarized light at an angle with respect to the transmitted light. Other possibilities for the transmitted and reflected polarizations of first polarizing beam splitter 14 will be obvious to one skilled in the art.

Figure 2:
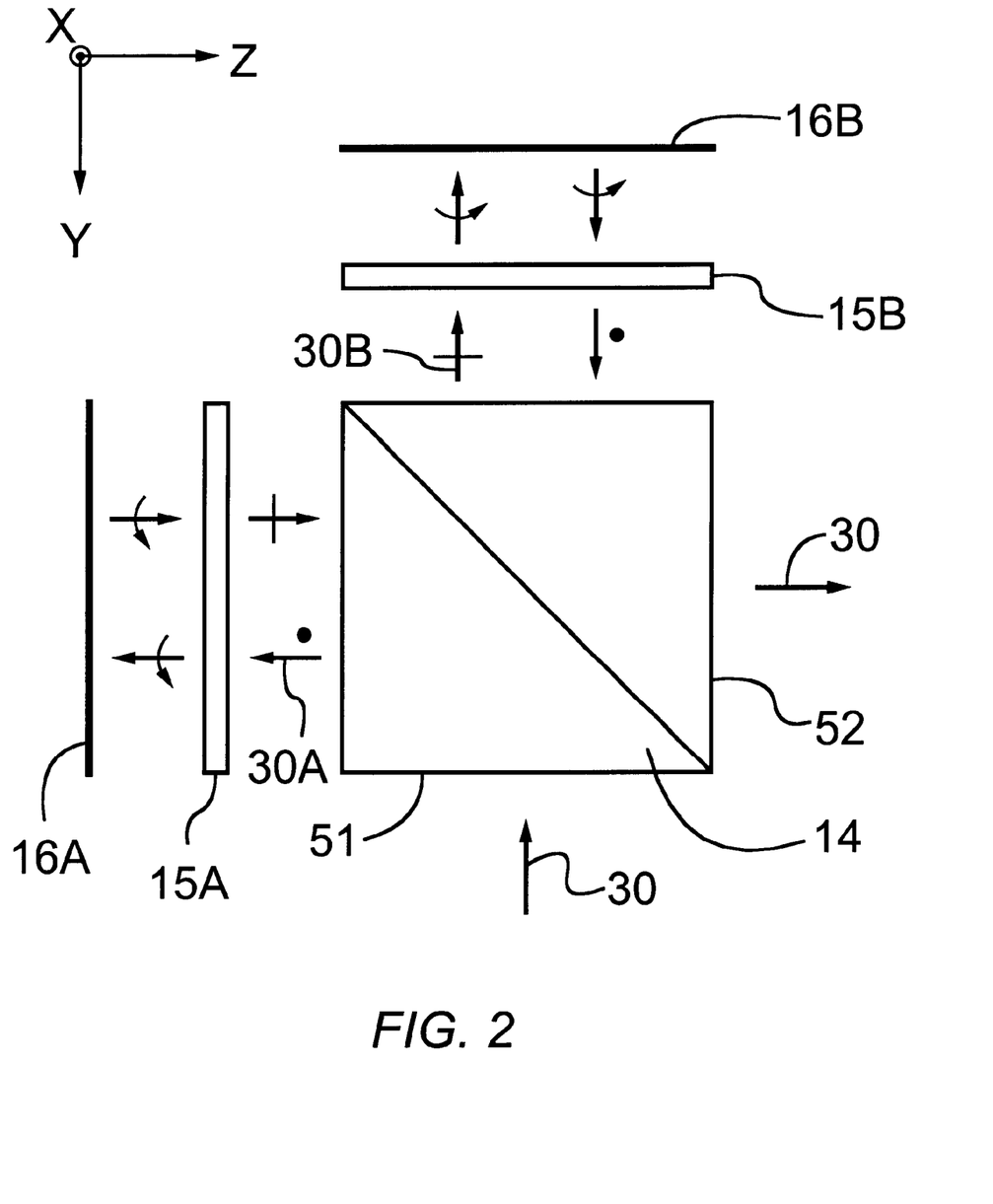
FIG. 2 is a top view of a polarizing beam splitter of the switch of FIG. 1.

FIG. 2 shows a schematic view of the evolution of a representative optical beam 30 emitted from one of the optical inputs. Beam 30 propagates in the negative y direction and is incident upon first polarizing beam splitter 14. Beam 30 enters first polarizing beam splitter through an entrance face 51. First polarizing beam splitter then splits beam 30 into two components, a first beam component 30A and a second beam component 30B. First beam component 30A is polarized in the x-direction, and second beam component 30B is polarized in the z-direction. The polarizations of the beam components 30A and 30B, immediately after leaving first polarizing beam splitter 14, are depicted in FIG. 2 by a dot and a thin line, respectively.

First beam component 30A passes through a first quarter wave plate 15A, which causes first beam component 30A to have circular polarization. In the illustrative case depicted by FIG. 2, first beam component 30A has left-handed circular polarization immediately after passing through first quarter wave plate 15A.

First beam component 30A is then reflected by a first deflector array 16A. Much more is said about this reflection below. For the purposes of FIG. 2, however, the salient feature is that first beam component 30A, once reflected, has right-handed circular polarization. First beam component 30A then passes through first quarter wave plate 15A for the second time, and exits the first quarter wave plate with y-polarization. First beam component 30A is now polarized in a direction that is transmitted by first polarizing beam splitter 14. First beam component 30A therefore travels through first polarizing beam splitter 14, and exits through an exit face 52.

Similarly, second beam component 30B passes through a second quarter wave plate 15B, is reflected by a second deflector array 16B, then travels back through second quarter wave plate 15B. The combined effect of second quarter wave plate 15B and second deflector array 16B is to rotate the polarization of second beam component 30B from z-polarization to x-polarization, as shown in FIG. 2. Second beam component 30B then re-enters first polarizing beam splitter 14, where it is reflected, and emerges from exit face 52.

First and second quarter wave plates 15A and 15B, together with first and second deflector arrays 16A and 16B, rotate the polarizations of first and second beam components 30A and 30B by 90 degrees. This rotation allows first polarizing beam splitter to not only split beam 30 into the two beam components 30A and 30B, but also to recombine the two beam components. Beam 30 is therefore reconstructed by first polarizing beam splitter 14. Beam 30, comprising the beam components 30A and 30B, emerges from exit face 52, as shown in FIG. 2.

Referring back to FIG. 1, a Fourier transform lens 10 is situated in front of exit face 52. The optical beams from input array 11 leave exit face 52 and pass through Fourier transform lens 10. The beams then enter a second polarizing beam splitter 24.

The second polarizing beam splitter acts much as the first polarizing beam splitter. For example, second polarizing beam splitter 24 splits optical beam 30 into first and second beam components 30A and 30B. The first beam component passes through a third quarter wave plate 25A, is reflected by a third deflector array 26A, and is then transmitted back through third quarter wave plate 25A. The fourth beam component similarly passes through a fourth quarter wave plate 25B, and is reflected by a fourth deflector array 26B back through quarter wave plate 25B.

Second polarizing beam splitter 24 therefore splits and recombines beam 30 using the same polarization properties as discussed above regarding first polarizing beam splitter 14. Second polarizing beam splitter 24 sends beam 30 toward an output array 21 comprising optical outputs 22. Beam 30 enters one of the optical outputs. Each optical output 22 preferably comprises an optical fiber, and each optical fiber is preferably coupled to a microlens 23.

First deflector array 16A, as shown in FIG. 1, comprises a two-dimensional array of input deflectors 17A. Each of the input deflectors 17A corresponds with one of the optical inputs 12. That is, each of the optical beams such as beam 30 incident from input array 11 is split into two beam components by first polarizing beam splitter 14; the first beam component strikes the input deflector 17A corresponding to the optical input 12 from which the beam came.

Similarly, second deflector array 16B comprises an array of secondary input deflectors 17B. Each secondary input deflector 17B reflects the second beam component of one of the optical beams incident from input array 12.

Each of the input deflectors 17A steers its associated beam component toward a desired one of the optical outputs 22. This steering is crucial to the operation of the switch, and is shown in more detail in FIG. 3A, which gives a top view of switch 100.

The input deflectors 17A are numbered from 1 to N, where N is the number of optical inputs 12. The x- and y-coordinates of the center of the $i^{th}$ input deflector 17A, measured with respect to the center of first deflection array 16A, are $(x_i, y_i)$. Similarly, third deflector array 26A comprises N output deflectors having coordinates $(x'_j, y'_j)$ for j=1 to N. An optical axis 40 is parallel to the z-axis and passes through the center of first deflector array 16A and the center of third deflector array 26A, as shown in FIG. 3A.

First and third deflector arrays 16A and 26A are placed in the focal planes of Fourier transform lens 10. That is, Fourier transform lens 10 has a focal length f, and the optical path length along the z-axis between first deflector array 16A and the center of Fourier transform lens 10 is f. The distance between Fourier transform lens 10 and third deflector array 26A is also f.

Figure 3A:
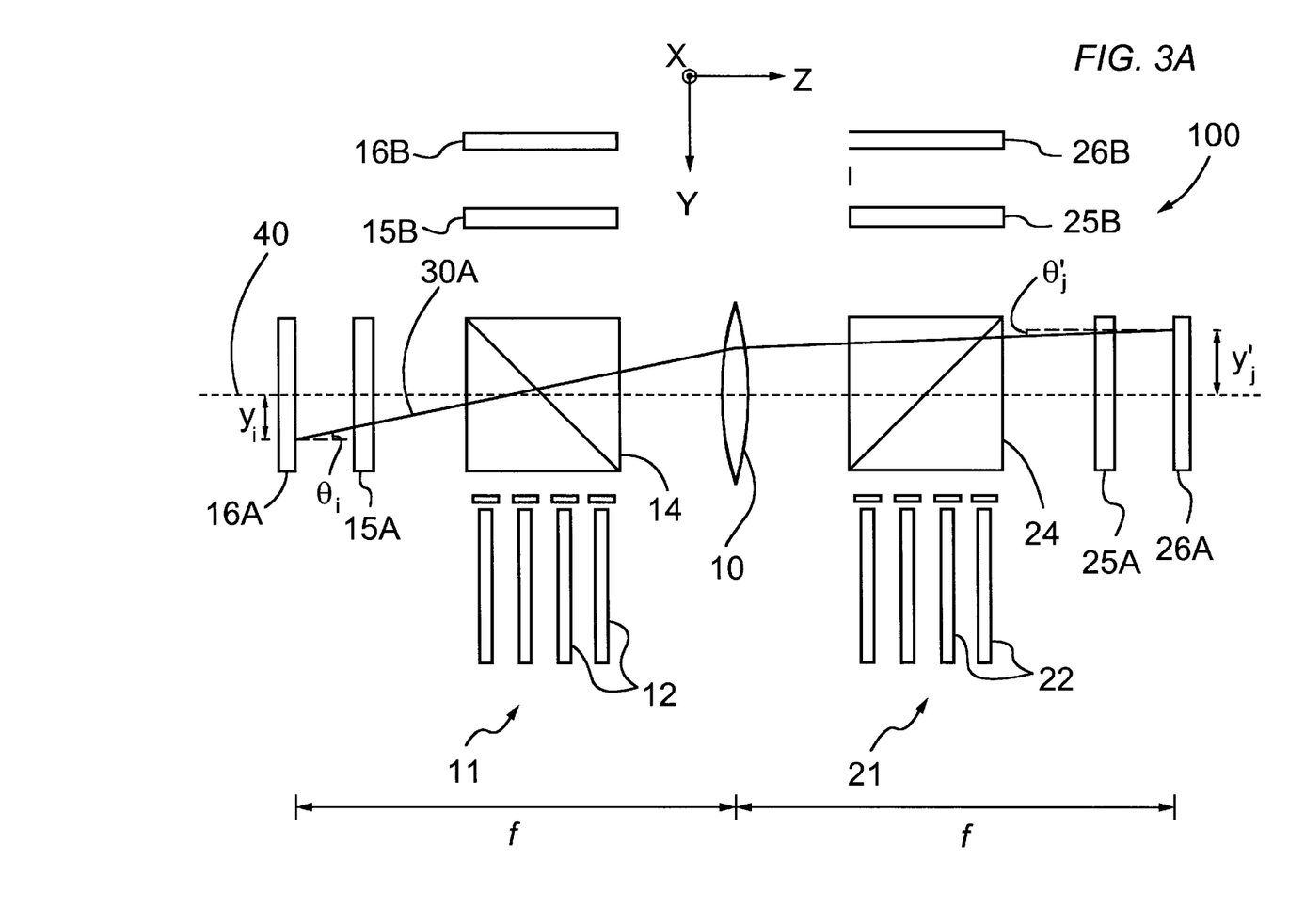
FIG. 3A is a top view of the switch of FIG. 1.

FIG. 3A illustrates how the $i^{th}$ optical input is coupled to the $j^{th}$ optical output. The $i^{th}$ input deflector of first deflector array 16A is positioned at an angle that causes the respective beam component, illustrated by beam component 30A in FIG. 3A, to be reflected with an angle $\theta_i$ with respect to the z-axis in the yz-plane. Angle $\theta_i$ is selected to direct beam component 30A to coordinates $(x'_j, y'_j)$ on third deflector array 26A. Angle $\theta_i$ is given by the following formula:

$$\tan \theta_i = -y'_j/f. \qquad (1)$$

Note that in the example shown in FIG. 3A, $y_i$ is positive, $y'_j$ is negative, and $\theta_i$ is positive. Eq. (1) expresses the general property that when a light beam is incident upon a Fourier transform lens with a specific direction of incidence, the light beam is transmitted to a certain location that is determined by the direction of incidence. To provide beam 30A with the necessary angle $\theta_i$, the plane of the $i^{th}$ input deflector is oriented with an angle $\theta_i/2$ with respect to the y-axis.

When beam component 30A reaches third deflector array 26A, it is reflected back anti-parallel to the z-axis so that it enters the $j^{th}$ optical output. To accomplish this, the $j^{th}$ output deflector of third deflector array 26A is oriented at an angle to compensate for an angle $\theta'_j$ with which beam component 30A impinges on the $j^{th}$ output deflector. Angle $\theta'_j$ depends upon the input deflector from which beam 30A originates, and is given by:

$$\tan \theta'_j = y_i/f. \qquad (2)$$

To compensate for angle $\theta'_j$, the $j^{th}$ output deflector is oriented at an angle $\theta'_j/2$ with respect to the y-axis.

Figure 3B:
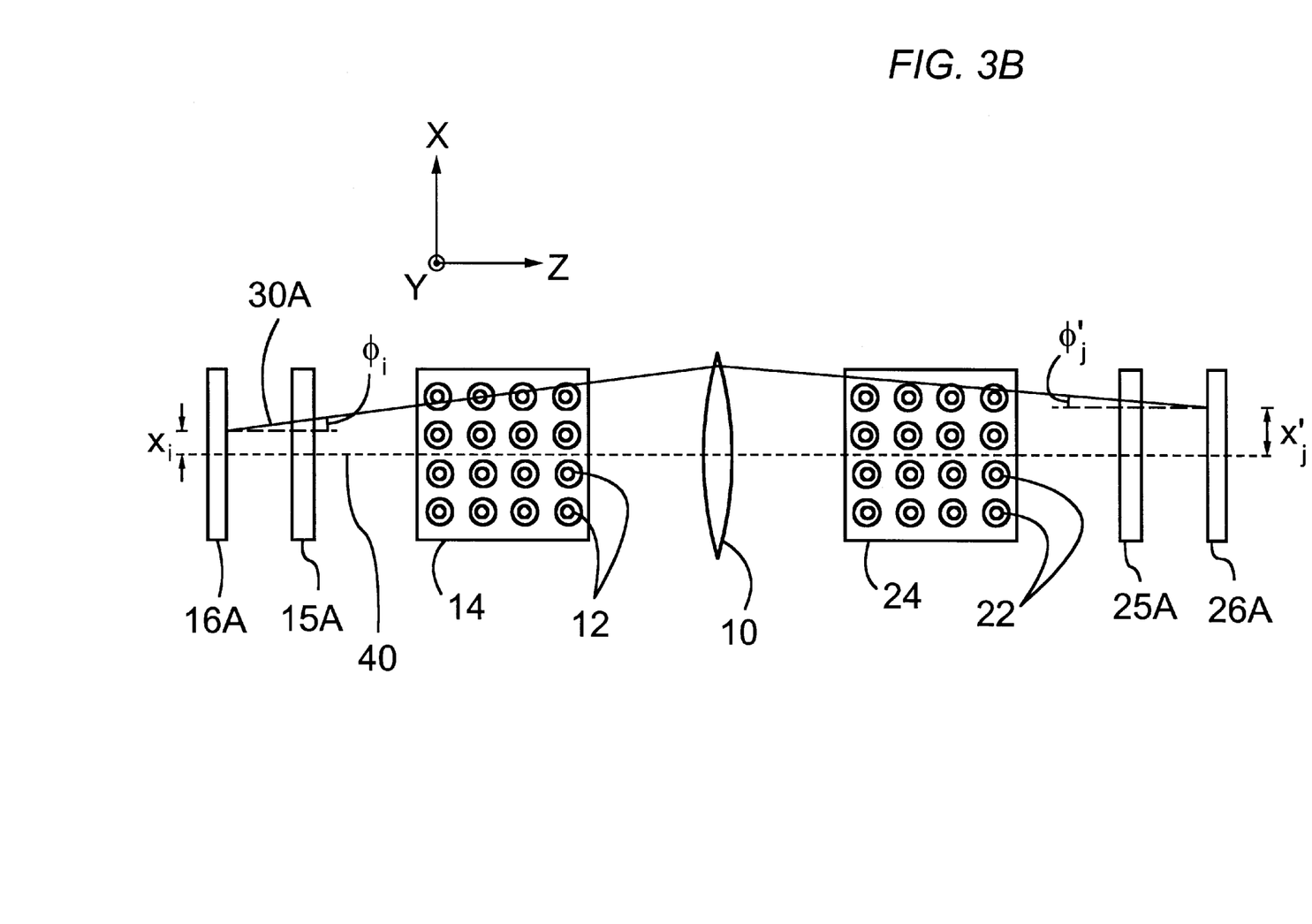
FIG. 3B is a side view of the switch of FIG. 1.

Eqs. (1) and (2) relate to the y-coordinates of the input and output deflectors. Similar equations apply to the x-coordinates, as shown in FIG. 3B, which again shows beam component 30A by way of example. Beam component 30A is reflected from first deflector array 16A with an angle $\phi_i$ with respect to the z-axis in the xz-plane. Angle $\phi_i$ depends on the destination of beam component 30A as follows:

$$\tan \phi_i = x'_j/f. \qquad (3)$$

Beam component 30A then impinges upon third deflector array 26A with an angle $\phi'_j$ given by $$\tan \phi'_j = -x_i/f. \qquad (4)$$

The $j^{th}$ output deflector is oriented to cancel angle $\phi'_j$, so that beam component 30A is anti-parallel to the z-axis after reflecting from the $j^{th}$ output deflector. The signs in Eqs. (3) and (4) are slightly different from the signs in Eqs. (1) and (2), due to the orientation of the x,y,z coordinate axes.

Eqs. (1)–(4) describe beam component 30A propagating from the $i^{th}$ input deflector of first deflector array 16A to the $j^{th}$ output deflector of third deflector array 26A. Similar equations apply for propagation from second deflector array 16B to fourth deflector array 26B. Second deflector array comprises the N secondary input deflectors 17B, and fourth deflector array comprises N secondary output deflectors 27B. The $i^{th}$ secondary input deflector is coupled to the $j^{th}$ secondary output deflector by applying equations similar to Eqs. (1)–(4), as will be obvious to one skilled in the art.

For example, the $i^{th}$ secondary input deflector is oriented so that second beam component 30B (see FIG. 2) emerges from exit face 52 of first polarizing beam splitter 14 with angles $\theta_i$ and $\phi_i$ in the yz- and xz-planes, respectively, with respect to the z-axis. Second beam component 30B is therefore collinear with first beam component 30A when the first and second beam components impinge upon Fourier transform lens 10.

In other words, first polarizing beam splitter 14 recombines first and second beam components 30A and 30B to regenerate beam 30. Beam 30 is incident upon Fourier transform lens 10 with a direction of incidence given by $\theta_i$ and $\phi_i$. The direction of incidence of beam 30 determines, through Eqs. (1) and (3), the optical output to which beam 30 is coupled.

In general, the $i^{th}$ optical input emits an $i^{th}$ optical beam. The $i^{th}$ input deflector and the $i^{th}$ secondary input deflector give the $i^{th}$ optical beam an $i^{th}$ direction of incidence upon Fourier transform lens 10. The $j^{th}$ output deflector and the $j^{th}$ secondary output deflector then direct the $i^{th}$ optical beam to the $j^{th}$ optical output, where j is determined by the $i^{th}$ direction of incidence. The optical inputs are thereby coupled one-to-one to the optical outputs. The deflectors belonging to the deflector arrays 16A–B and 26A–B are positioned to obtain the desired correspondence between the optical inputs and the optical outputs.

Second polarizing beam splitter 24 splits and then recombines the optical beams. When the optical beams are recombined, they are parallel, due to the orientation of the deflectors belonging to third and fourth deflector arrays 26A and 26B.

In the preferred embodiment, the deflector arrays are Micro-Electro-Mechanical Systems, or MEMS, deflector arrays. Each deflector array typically comprises a silicon substrate, and micromachining techniques are used to fabricate the deflectors belonging to the deflector arrays. The deflectors are rotated using electrical currents. To operate the switch, a computer or other electronic control system is used to produce the angles required by Eqs. (1)–(4).

Each one of microlenses 13 is preferably positioned to focus the light beam that passes through it onto first and second deflector arrays 16A and 16B. For example, the microlens corresponding to beam 30 preferably shapes the beam so that first beam component 30A is focussed on one of the input deflectors 17A, and second beam component 30B is focussed on one of the secondary input deflectors 17B. Similarly, in the preferred embodiment, each microlens 23 is positioned to couple one point on deflector array 26A and another point on deflector array 26B to one of the optical outputs 22.

Switch 100 is preferably symmetric with respect to an exchange of the optical inputs and the optical outputs. This symmetry is clearly seen in FIG. 1, where the switch is symmetric with respect to a reflection through the plane parallel to the yz-plane that passes through the center of Fourier transform lens 10. The symmetry allows the switch to operate in reverse, with light entering the switch through the optical outputs, and leaving the switch through the optical inputs. Therefore, the distinction between the optical inputs and the optical outputs is purely formal, used only to clarify the operation of the switch.

Switch 100 uses Fourier transform lens 10 to overcome diffraction effects that would otherwise limit the miniaturization of the switch. The optical beams tend to diverge before entering Fourier transform lens 10, but the lens causes the beams to converge again. Thus, Fourier transform lens 10 cancels the spreading of the optical beams, allowing the input, output, and deflector arrays to be small.

For example, first beam component 30A is preferably focussed to a small diameter on first deflector array 16A by one of the microlenses 13. First beam component 30A then spreads during its travel from first deflector array 16A to Fourier transform lens 10. The Fourier transform lens refocuses first beam component 30A, so that the diameter of the first beam component decreases as it propagates from Fourier transform lens 10 to third deflector array 26A. In keeping with the preferred symmetry of switch 100, beam 30A preferably has the same diameter at third deflector array 26A as it has at first deflector array 17A.

The description of switch 100 contains many specifics that are used by way of illustration but that are not intended to limit the scope of the invention. For example, first polarizing beam splitter 14 can be arranged so that just after beam 30 is split into first and second beam components 30A and 30B, first beam component 30A is polarized along any desired direction. Furthermore, second polarizing beam splitter 24 may be arranged to deliver first beam component 30A to either third deflector array 26A or to fourth deflector array 26B.

Figure 4:
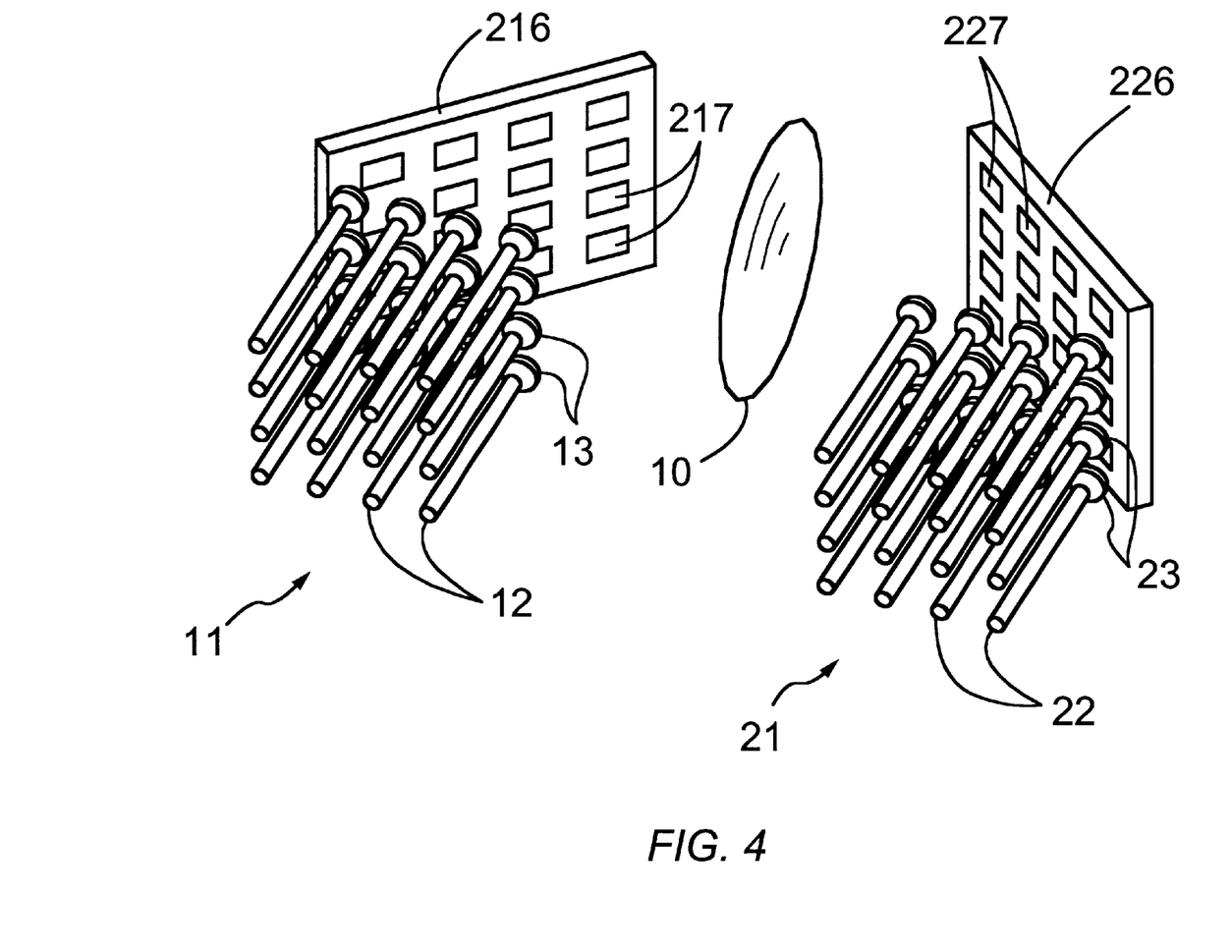
FIG. 4 is an optical switch according to a second embodiment of the invention.

Furthermore, FIG. 1 shows only one possible arrangement for delivering the optical beams from the optical inputs, through the Fourier transform lens, to the optical outputs. FIG. 4 shows a switch 200 according to a second embodiment of the invention. Switch 200 comprises input array 11 of optical inputs 12, output array 21 of optical outputs 22, and Fourier transform lens 10, as does switch 100. In the second embodiment, however, a first oblique deflector array 216 is positioned to deflect the optical beams from the input array directly to Fourier transform lens 10 without the intervention of a polarizing beam splitter. A second oblique deflector 226 array renders the optical beams parallel to each other and delivers the optical beams to the output array.

In switch 200 of FIG. 4, first and second oblique deflector arrays 216 and 217 comprise deflectors 217 and 227, respectively. As in switch 100, the $j^{th}$ optical input is coupled to the $j^{th}$ optical output by giving the $i^{th}$ optical beam the $i^{th}$ direction of incidence upon Fourier transform lens 10. The $i^{th}$ direction of incidence is characterized by $\theta_i$ and $\phi_i$, and is determined by Eqs. (1) and (3). Oblique deflector arrays 216 and 217 are preferably MEMS deflector arrays.

Figure 5:
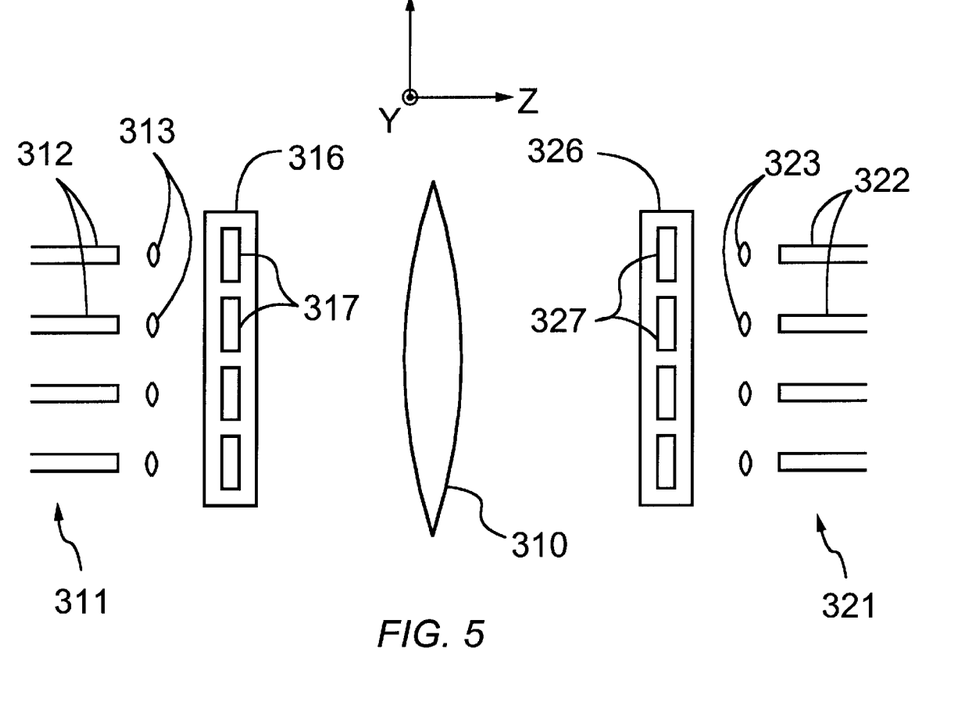
FIG. 5 is an optical switch according to a third embodiment of the invention.

The deflector arrays used in switches 100 and 200 are reflective. A third embodiment uses transmissive deflector arrays. A switch 300 according to the third embodiment of the invention is shown in FIG. 5. A two-dimensional input array 311, extending in the x- and y-directions in FIG. 5, faces a two-dimensional output array 321. Input array 311 comprises optical inputs 312, and output array 321 comprises optical outputs 322. Preferably, each optical input and each optical output comprises an optical fiber. The optical fibers belonging to the input array and to the output array are preferably coupled to microlenses 313 and 323, respectively.

Optical beams emanating from optical inputs 312 pass through a transmissive input deflector array 316. The transmissive input deflector array comprises transmissive deflectors 317. Each optical input 312 is positioned to emit an optical beam that passes through one of the transmissive deflectors 317. Each transmissive deflector 317 gives its associated optical beam a direction of incidence upon a Fourier transform lens 310. The direction of incidence of the $i^{th}$ optical beam determines the optical output to which the $i^{th}$ optical beam is transmitted, as in the previous embodiments.

A transmissive output deflector array 326 comprising transmissive deflectors 327 is situated between Fourier transform lens 310 and output array 321. Each of the optical beams passes through one of the transmissive deflectors 327, then propagates to one of the optical outputs 322. As in the previous embodiments, transmissive deflectors 327 compensate for the angles $\theta'_j$ and $\phi'_j$ that the optical beams have after leaving Fourier transform lens 310. Transmissive deflectors 327 render the optical beams parallel.

Figure 6:
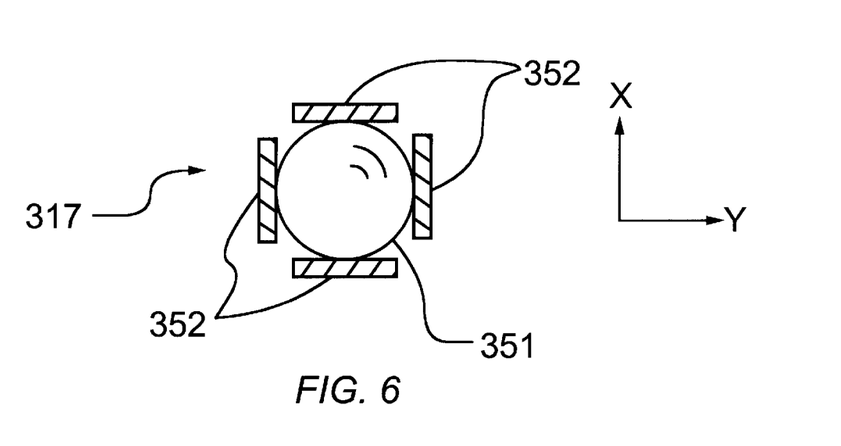
FIG. 6 shows a transmissive deflector belonging to the switch of FIG. 5.

Transmissive deflectors 317 and 327 comprise any transmissive deflectors known in the art. FIG. 6 shows an example of a particular design for the transmissive deflectors. The transmissive deflector of FIG. 6 comprises a lens 351 and movers 352. Movers 352 translate lens 351 in the x- and y-directions, thereby deflecting the optical beam passing through lens 351. Movers 352 are, for example, piezo-electric devices.

In view of embodiments 100, 200, and 300, optical switches according to the present invention use either transmissive or reflective deflectors, each deflector being positioned to steer either a single polarization component or all polarization components of the associated optical beam. These and other variations will be apparent to one skilled in the art. Therefore the scope of the invention should be determined by the following claims and their legal equivalents.

We claim:

1. An optical switch comprising:
   a) a Fourier transform lens;
   b) a two-dimensional array of optical inputs positioned to transmit a plurality of optical beams through said Fourier transform lens, each said beam having a respective direction of incidence upon said Fourier transform lens;
   c) a first deflection means for controlling said directions of incidence;
   d) a two-dimensional array of optical outputs for receiving said beams;
   e) a second deflection means for coupling said beams to said optical outputs; and
   f) a first polarizing beam splitter positioned to split each said beam into first and second components, and to recombine said first and second components of each beam;

whereby said optical inputs are coupled one-to-one with said optical outputs.

2. The optical switch of claim 1, wherein said first deflection means comprises
   a) a first deflector array for deflecting the first component of each of said beams, and
   b) a second deflector array for deflecting the second component of each of said beams.

3. The optical switch of claim 1, further comprising
   a) a means for rotating a polarization of the first component of each of said beams by 90°, and
   b) a means for rotating a polarization of the second component of each of said beams by 90°.

4. The optical switch of claim 1, wherein said switch is substantially symmetric with respect to an interchange of said optical inputs with said optical outputs.

5. The optical switch of claim 1, wherein said first deflection means is reflective.

6. The optical switch of claim 5, wherein said first deflection means comprises a first MEMS deflector array.

7. The optical switch of claim 1, wherein said first deflection means is transmissive.

8. The optical switch of claim 1, wherein each of said optical inputs comprises an optical fiber.

9. The optical switch of claim 8, further comprising a plurality of microlenses positioned to focus said beams onto said first deflection means.

10. An optical switch comprising:
    a) a two-dimensional array of optical inputs positioned to emit a plurality of optical beams;
    b) a first deflection means positioned to controllably give each of said optical beams a respective direction of incidence;
    c) a Fourier transform lens positioned to transmit said optical beams;
    d) a second deflection means positioned to render said optical beams parallel;
    e) a two-dimensional array of optical outputs positioned to receive said optical beams; and f) a first polarizing beam splitter positioned to split each said beam into first and second components, and to recombine said first and second components of each beam;

wherein said directions of incidence have a one-to-one correspondence with said optical outputs, whereby said optical inputs are coupled one-to-one with said optical outputs.

11. The optical switch of claim 10, wherein said first deflection means comprises
   a) a first deflector array for deflecting the first component of each of said beams, and
   b) a second deflector array for deflecting the second component of each of said beams.

12. The optical switch of claim 10, further comprising
   a) a means for rotating a polarization of the first component of each of said beams by 90°, and
   b) a means for rotating a polarization of the second component of each of said beams by 90°.

13. The optical switch of claim 10, wherein said switch is substantially symmetric with respect to an interchange of said optical inputs with said optical outputs.

14. The optical switch of claim 10, wherein said first deflection means is reflective.

15. The optical switch of claim 14, wherein said first deflection means comprises a first MEMS deflector array.

16. The optical switch of claim 10, wherein said first deflection means is transmissive.

17. The optical switch of claim 10, wherein each of said optical inputs comprises an optical fiber.

18. The optical switch of claim 17, further comprising a plurality of microlenses positioned to focus said beams onto said first deflection means.

19. A method of optical switching between a two-dimensional array of optical inputs and a two-dimensional array of optical outputs, the method comprising:
   coupling input optical beams into the optical switch through the two-dimensional array of optical inputs;
   using a first deflector array to controllably steer each of the input optical beams toward a desired optical output in the two-dimensional array of optical outputs, producing a plurality of steered optical beams;
   passing the steered optical beams through a Fourier transform lens;
   using a second deflector array to controllably direct the steered optical beams passed through the Fourier transform lens into the optical outputs of the two-dimensional array of optical outputs, producing an array of output optical beams; and
   coupling the array of output optical beams out of the optical switch through the two-dimensional array of optical outputs;
   wherein said optical inputs are controllably coupled one-to-one with said optical outputs.

* * * * *